U. Kimble,
Boring Hubs,
№ 12,598. Patented Mar. 27, 1855.
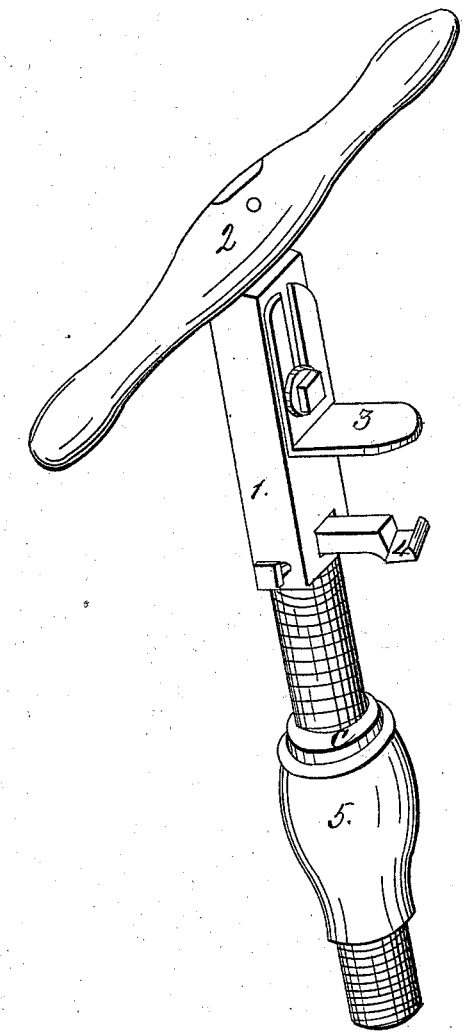

UNITED STATES PATENT OFFICE.

URIAS KIMBLE, OF PENFIELD, NEW YORK.

TOOL FOR BORING HUBS TO RECEIVE BOXES.

Specification of Letters Patent No. 12,598, dated March 27, 1855.

*To all whom it may concern:*

Be it known that I, URIAS KIMBLE, of Penfield, in the county of Monroe and State of New York, have invented a Tool to Cut the Gain in Wagon-Wheels for Setting the Box, which I call a "Box-Setter;" and I do hereby declare that the following is a full and exact description of the construction and operation of the same, reference being had to the annexed drawings, making a part of the specification, in which—

Figure 1 is a perspective view of the shaft. Fig. 2 is a perspective view of the handle. Fig. 3 is a perspective view of the slide gage. Fig. 4 is a perspective view of the adjustable knife. Fig. 5 is a perspective view of the oval shaped box and nut resting on the top of it.

The nature of my invention consists in constructing a shaft about eighteen inches long. About one third of the upper end of this shaft is square. The remaining part I make round and cut a screw on it on which I run a nut with spurs on the bottom of the nut which rests on an oval shaped box which has a hole through it to receive the shaft. I attach an adjustable gage to the shaft which is kept in its place by a set screw. I also attach an adjustable knife to the shaft which is held in its place by a set screw. There is a handle to the top of the shaft to turn it by.

To enable others to make and use my invention I will proceed to describe its construction and operation.

I construct a shaft (Fig. 8) from eighteen to twenty inches long and about one and a fourth inches square at the top with about two thirds of the bottom part round. I make the shaft of iron or any other suitable material. I attach a handle (Fig. 2) on the upper end of the shaft to turn it by. I cut a screw on the round part of the shaft and fit a nut (Fig. 5) to it with spurs on the underside of it to hold it from turning the spurs catching to the box it rests on. I construct an oval-shaped box (Fig. 5) about five inches long with a hole in the center to receive the round part of the shaft. This box is squared at each end and of the right size to fit in the hub of the wheel when rimmed out ready to set the box. The screw with spurs on the underside is to be run on to the shaft and the oval shaped box is to follow it. I construct a gage in shape like an L (Fig. 3) with a slot in it for a set screw to hold it to the shaft above the knife. I construct a knife or cutter (Fig. 4) of steel the shank to the knife is about half an inch square and one and three fourths inches long or as long as may be necessary. The knife is formed on the end of the shaft in shape like the set to an auger the square part of the shank to this knife runs through the square part of the shaft just above where it is round and is held in the place defined by a set screw.

The object of this invention is to cut a gain in the hubs of wagon wheels of any desired size and depth and to cut the gain in the center of the hub by a quick and easy mode insuring uniformity combined with facility and economy and is so constructed that by the use of the gage (Fig. 3) that it cuts the gain the depth desired. The knife (Fig. 4) may be set to cut any sized gain desired. The oval shaped box (Fig. 5) through which the shaft runs is calculated to steady the shaft and may be adjusted as it is oval so that the knife will start in the center whether the hub is rimmed out true or not previous to cutting the gain it is to be driven into the hub sufficiently tight to steady the shaft when in motion. The nut (Fig. 5) is to prevent the knife from going in or cutting too fast. The spurs on the bottom of the nut is to prevent its turning when the shaft is in motion. The handle (Fig. 2) is to turn the shaft which gives the knife its motion while the knife is cutting the gain to receive the box to be set.

I do not claim the shaft, the adjustable knife, or the adjustable gage as they have been known before, but

I claim—

The oval shaped box with the nut with spurs on the under side resting on the oval shaped box in combination with the shaft the knife and the gage for the purpose above set forth.

URIAS KIMBLE.

Witnesses:
I. C. RICH,
WM. VANANTWERP.